United States Patent

[11] 3,572,439

| [72] | Inventors | Stanley O. Hutchison<br>Bakersfield;<br>Glen W. Anderson, Oildale; John C. McKinnell, Taft, Calif. |
|---|---|---|
| [21] | Appl. No. | 814,168 |
| [22] | Filed | Apr. 7, 1969 |
| [45] | Patented | Mar. 30, 1971 |
| [73] | Assignee | Chevron Research Company<br>San Francisco, Calif.<br>Continuation-in-part of application Ser. No. 720,977, Apr. 12, 1968, now Patent No. 3,486,560. |

[54] CONCENTRATES FOR THE PREPARATION OF AMMONIATED FOAMED CIRCULATION FLUIDS AND USE THEREOF
24 Claims, No Drawings

[52] U.S. Cl. ............................................ 166/309, 175/69, 252/8.5, 252/152
[51] Int. Cl. ............................................ E21b 21/04, C11d 1/14
[50] Field of Search ............................................ 166/275, 274, 273, 309, 311; 175/69, 71; 252/8.55 (D), 8.5, 305, 307, 137, 152, 153, 155

[56] References Cited
UNITED STATES PATENTS

| 2,554,913 | 5/1951 | Kimball | 252/152X |
| 2,801,978 | 8/1957 | Perlman | 252/137 |
| 3,001,947 | 9/1961 | Stahler et al. | 252/152 |
| 3,017,363 | 1/1962 | Wilson | 252/152 |
| 3,229,777 | 1/1966 | Rogers | 166/309X |
| 3,303,896 | 2/1967 | Tillotson et al. | 166/309X |
| 3,330,346 | 7/1967 | Jacobs et al. | 166/274X |
| 3,335,792 | 8/1967 | O'Brien et al. | 166/273 |
| 3,376,924 | 4/1968 | Felsenthal et al. | 166/274X |
| 3,391,750 | 7/1968 | Zika | 175/69X |
| 3,486,560 | 12/1969 | Hutchison et al. | 175/69X |

*Primary Examiner*—Stephen J. Novosad
*Attorneys*—A. L. Snow, F. E. Johnston, J. Stoner, Jr. and D. L. Hagmann ABSTRACT: The use of ammoniated concentrates for the preparation of ammoniated gas-in-liquid foams for circulation in a well and ammoniated concentrated compositions of anionic oxidized-sulfur containing foaming agents in water or water lower alkanol solvent mixtures.

CONCENTRATES FOR THE PREPARATION OF AMMONIATED FOAMED CIRCULATION FLUIDS AND USE THEREOF

CROSS-REFERENCES TO RELATED APPLICATIONS

This application is a continuation-in-part of Ser. No. 720,977, filed Apr. 12, 1968, and now U.S. Pat. No. 3,486,560 in which the use of ammoniated foamed well circulation fluids is disclosed. In our copending applications, Ser. No. 704,832, filed Feb. 12, 1968, now U.S. Pat. No. 3,463,231 and Ser. No. 720,977, filed Apr. 12, 1968, now U.S. Pat. No. 3,486,560, we have disclosed improved methods for the circulation of foamed fluids in wells.

FIELD OF INVENTION

This invention relates to well circulation fluids. More particularly, it relates to concentrates useful for the preparation of improved low density, low velocity well completion and cleanout fluids. Still more particularly, it relates to ammoniate aqueous concentrates useful for the production of aqueous gas-in liquid foams having improved flow characteristics in their employment as circulation fluids in wells.

INVENTION DESCRIPTION

It has now been found that the production of aqueous ammoniated gas-in-liquid foams is facilitated by the use of ammoniated concentrates of organic foaming agents. Satisfactory concentrates should contain, based upon 100 parts by weight of water or water plus a cosolvent, at least about 14 parts of unneutralized ammonia and for each part of unneutralized ammonia about 0.1 to 5 part of the foaming agent.

Particular advantages of the instant concentrates includes the removal of one variable in the operation of a foam circulation unit at a well-head, the convenience of weight saving in the transport of foam generation materials to the field of use, and better control of the relative amounts of foaming agent and unneutralized ammonia than is ordinarily achievable in the field.

The ammoniated concentrates of the invention are useful for the production of aqueous foams having improved characteristics, particularly in their use as low velocity circulation fluids in a well where the annular velocities are blow below about 600—800 feet per minute. These foamed fluids are superior to nonammoniated foams in view of the relatively low back pressures which they exhibit in their circulation in a wellbore and annulus. They are useful for the preparation of well circulation fluids in general, and, in particular, for the production of preformed foams, that is, foams prepared out of contact with the solids and/or liquids naturally encountered in a wellbore, i.e., a foam formed out of contact with contaminants associated with a wellbore environment including cuttings, oil, brine, and the like. Representative specific uses for the foams which can be prepared from the ammoniated concentrates of the present invention are circulation fluids in the drilling of a well, in the removing solids or liquids from a well, in scrubbing or cleaning a well, and the like.

By a Ross-Miles initial foam height, as used herein, is meant the initial or 0 time foam height as obtained in the standard Ross-Miles foam analysis method [cf Ross, J. and Miles, G.D., "An apparatus for comparison of foaming properties of soaps and detergents," Oil & Soap, Volume 18, 1941, Pages 99—102, and McCutcheon, J.W., "Synthetic Detergents," McNair-Dorland Company, New York, N.Y. 1950, Page 435.]

By a cumulative foam height, as used herein, is meant the sum of the foam heights at the 0, 1, 2, 5, and 10 minute intervals as obtained in the Ross-Miles method.

By unneutralized ammonia is meant ammonia plus hydrated ammonia, i.e., $NH_3$ and $NH_4OH$, in excess of ammonium salt forming acid which may be present in the concentrate. For convenience herein concentrates containing unneutralized ammonia are referred to as ammoniated concentrates.

By circulation in a well, as used herein, is meant flow through a conduit system in a well as via a pipe, a well bore, a well annulus, a natural channel, an artificial channel or the like. A particular type of flow contemplated herein is that where the fluid returns to the wellhead.

As used herein, by relative proportions in parts is meant parts by weight.

In a preferred embodiment of the invention about 5 parts of a sulfonate salt, such as sodium polypropylbenzene (tetramer) sulfonate is dissolved in 100 parts of the concentrated aqueous ammonia (~28 percent) of commerce. The resulting ammoniated sulfonate concentrate may, if desired, be brightened or freed of particulate matter by filtration through a suitable filter aid or may be used per se for distribution to the trade and ultimately to foam generation units in the field where the concentrate is introduced together with air and water of dilution into a suitable foam producing unit and the resulting foam is circulated in a well. Noninterfering additives, such as viscosity reducing agents, cosolvents and the like may also be added.

Polar solvents such as water and water-cosolvent mixtures are satisfactory media for the subject concentrates. Water is preferred. One or more cosolvents such as lower alkanols ($C_1$—$C_3$ alkanols), and acetone may be used together with water, and the latter should constitute at least about 50 weight percent of the solvent mixture.

The amount of the active ingredients, i.e., foaming agent and unneutralized ammonia, which should be present in the concentrates of the invention, varies over a range. For a reasonable advantage, saving of weight, etc., the concentrate should contain at least about 50 percent of the ammonia required for saturation of the solution. Where water is the solvent, this amounts to about 14 parts of ammonia per 100 parts of water. More advantageously, the concentrate should contain an amount of unneutralized ammonia in the range 75 to 100 percent of the saturation value. Usually the more desirable and preferred concentrates contain the saturation or near saturation amount of ammonia, i.e., at least about 90 percent of the saturation value.

The amount of organic foaming agent which should be present in the concentrate varies. In general, for each part of unneutralized ammonia, the instant concentrates should contain at least about 0.1 part of the foaming agent. The range 0.2—1 parts of agent per part of ammonia is preferred. Larger relative amounts, i.e., as much as 5 to 1 and higher, respectively, may be used; however, with increasing relative amounts of the foaming agent, the unneutralized ammonia effect becomes undesirably diminished in the foams which can be prepared from such concentrates.

Organic foaming agents are, in general, satisfactory for the preparation of the ammoniated concentrates of the subject invention; and these yield improved well circulation fluids when they contain sufficient unneutralized ammonia. Preferred foaming agents are those which have a Ross-Miles initial foam height of at least 10 centimeters and a cumulative foam height of at least 30 centimeters [ASTM D1173-53 (1965); also, see Bureau of Mines, Monograph 11, by H. N. Dunning, J. L. Eakin and C. J. Walker, pp. 11—14]at the concentration being employed.

By organic foaming agents is organic compounds, in general, whose solutions form foam when a gas is bubbled through them, including anionic, cationic, amphoteric and nonionic surface active agents, and mixture thereof. [See, for example, "Detergents and Emulsifiers," 1966 Annual, John W. McCutcheon, Inc., also "Surface Active Agents," Volumes I and II, A. M. Schwartz, J. W. Perry and J. Berch, Interscience Publishers, Inc., New York (1949 and 1958).]

Anionic foaming agents are preferred for use in the preparation of the subject ammoniated foaming agent concentrates. Of these agents, the anionic surfactants of the formula $$R(O)_m SO_3 M$$

in which $R$ represents an oleophilic radical, $M$ represents the ammonium or an alkali metal cation, and $m$ is zero or 1, are preferred for use herein. They yield foams which are especially benefited when used as well circulation fluids by the presence of unneutralized ammonia. The radical $R$ may be a hydrocarbon radical containing from about 8 to 20 carbon atoms or a radical of the formula $R'(OCH_2CH_2)_n$ in which $R'$ is an oleophilic hydrocarbon radical containing from about 8 to 18 carbon atoms, preferably 10 to 20, and $n$ is a whole number in the range from 1 to about 15, preferably 3 to 10, inclusive.

Hydrocarbon radicals in general having the specified carbon atom content are contemplated as groups $R$ or $R'$ in the formulas above. Representative classes include such radicals as alkyl, cycloalkyl, aryl, alkylaryl, alkenyl, alkylcycloalkyl, alkenylcycloalkyl, alkenylaryl, arylalkenyl, and the like radicals. Preferred hydrocarbon radicals are the aliphatic or alkylarlyl hydrocarbon radicals.

Representative preferred classes of foaming agents useful in the instant invention include the alkylbenzene sulfonates, the paraffin sulfonates, the alpha-olefin sulfonates, the internal olefin sulfonates, and the like, i.e., where $m$ of the above formula is zero and the foaming agent has the formula $RSO3M$ and $R$ and $M$ are defined as stated above. Of these foaming agents, the alpha-olefin sulfonates are particularly preferred. These materials are mainly alkenyl sulfonates and are a complex mixture of compounds which yield an ammoniated foam which is a particularly effective well circulation fluid. In general, they yield foams which are dense and made up of relatively uniform small bubbles. The small bubble sizing appears to promote foam stability and to impart to them excellent circulation characteristics.

Similar to the alpha-olefin sulfonates, the sulfates of the formula $R'(OCH2CH2)_yOSO3M$, where $y$ is an integer in the range 3 to 10, inclusive, $M$ is defined as above and $R'$ is an alkyl radical containing from 8 to 18 carbon atoms, yield exceptional ammoniated well circulation foams.

By definition as used herein, by the term "olefin sulfonate" is meant the product mixture obtained at a reaction temperature in the range from about 10 to 100° C. from the reaction of an alpha-olefin, $RCH=CH_2$, or internal olefin where $R$ is an alkyl radical of the $C_8$—$C_18$ range, wit sulfur trioxide diluted by air with the product being neutralized and hydrolyzed using aqueous aqueous sodium hydroxide or an equivalent strong mineral base at a temperature in the range from about 50° to 160° C. (See, for example, "Alpha-Olefins in the Surfactant Industry" by T. H. Liddicoet, the American Oil Chemists Society, Nov. 1963, Volume 40, No. 11, pp. 631—636, and "Alpha-Olefin Sulfonates from a Commercial SO3-Air Reactor by D. M. Marquis et al., ibid, Volume 43, No. 11, pp. 607-—614 (1966).

The use of molecular mixtures of a given foaming agent species as well as individual molecular species of the aforedescribed organic foaming agents is contemplated. Mixtures which contain two or more foaming agent species are also contemplated. In particular, of the mixtures of foaming agent species, the alkylbenzene sulfonates and alpha-olefin sulfonates are preferred for use in the production of ammoniated foams in which each foaming agent species is in turn a molecular mixture, for example, a $C10$-$C_13$ for example, a $C_{10}$-$C_{15}$-alkylbenzene sulfonate molecular mixture plus a $C_{14}$-$C_{18}$ alpha-olefin sulfonate mixture.

Representative foaming agents useful in the practice of the subject invention include sodium, potassium and ammonium polypropylene tetramer benzene sulfonate, polypropylene pentamer benzene sulfonate, n-dodecylbenzene sulfonate, s-tetradecylbenzene sulfonate, s-hexadecylbenzene sulfonate, and the like; lauryl sulfate, octadecyl sulfate, $n$-$C_{10}$-$H_{21}SO_3^-$, $n$-$C_{10}$-$C_{15}SO_3^-$, mixtures; $C_{12}$-$C_{15}$-alpha-olefin sulfonate mixtures, 1-dodecene-1-sulfonate, tetradecane-2-sulfonate; $nC8H_6$ $(OCH2CH_2)_nOSO_3^-$; laurate, dodecanoate, and the like foaming agents.

Other representative foaming agents useful in the instant process include: ethanolated alkyl guanidine-amine complex, isopropyl naphthalene sodium sulfonate, dioctyl sodium sulfosuccinate, dicoco dimethyl ammonium chloride, tallow trimethyl ammonium chloride, fatty alcohol alkylolamine sulfate, condensation of hydrogenated tallow amide and ethylene oxide, modified fatty alkylolamide, lauric diethanolamide, fatty acid alkanol-amide, condensation product of ethylene oxide with propylene glycol, C-cetyl betaine, polyoxyethylene alkyl aryl ether, sodium alkyl naphthalene sulfonate, alkyl aryl polyether alcohol, sorbitan mono-oleate, octylphenoxyethanols, dioctyl sodium sulfosuccinate, modified phthalic glycerol alkyl resin, isoctyl phenyl polyethoxy ethanol (about 5 ethoxy groups per molecule).

Yet further representative foaming agents useful in the preparation of the present concentrates includes:

1. the sodium linear alkyl benzene sulfonate mixture of $C_{10}$-—$C_{15}$ alkyl range, i.e., $RC6H4SO3Na$ Na ($R$ is secondary alkyl);
2. the sodium salt of a $C_{15}$—$C_{18}$ alpha-olefin sulfonate (prepared from $C_{15}$—$C_{18}$ alpha-olefin molecular weight range);
3. the ammonium salt of a $C_{15}$—$C_{18}$ alpha-olefin sulfonate (prepared from $C_{15}$—$C_{18}$ alpha-olefin molecular weight range);
4,5. sulfonates analogous to 2 and 3 above, except that the olefin is an internal-olefin in contrast to the terminal or $\alpha$-olefin feed;
6. the ammonium salt of a sulfated and ethoxylated alcohol of the formula $R(OCH2CH2)_{3\text{ to }5}OSO_3NH4$, where $R$ is a $C_{12}$ or $C_{13}$ alkyl group (50/50 mixture);
7. the sodium sulfonate of a $C_{18}$—$C_{20}$ alpha-olefin derived benzene alkylate (average molecular weight 350) plus the sodium salt of a pentamer polypropylbenzene sulfonate, two parts by weight of the former and one part by weight of the latter;
8. the ammonium salt of a linear alkylbenzene sulfonate ($RC6H4SO3NH4$) in which the alkyl groups, $R$, are a $C_1$-—$C_{14}$ mixture;
9. the sodium salt of a $C_{10}$—$C_{20}$ alpha-olefin sulfonate (prepared from the $C_{10}$—$C_{20}$ product fraction from the vapor phase thermal cracking of normal paraffinic wax, e.g., Minas wax.)

A further representative method for the preparation of the ammoniated concentrates herein is to introduce gaseous ammonia into concentrated aqueous, or water-lower-alkanol solvent solutions of the foaming agent until little or no absorption of the gas occurs.

It will be readily appreciated from the foregoing disclosure and examples that variations can be made by those skilled in the art without departing from the scope and support of the appended claims.

We claim:

1. In the production of a gas-in-liquid foam for circulation in a well wherein the foam is produced from a foamable aqueous solution of an organic foaming agent and an inert gas, the improvement which comprises employing in the preparation of the foamable solution an ammoniated aqueous concentrate of the agent, wherein in parts by weight for each 100 parts of solvent in the concentrate there is present an amount of unneutralized ammonia which is at least 50 percent of the saturation value of ammonia for said solvent and at least about 0.1 part of the agent for each part of ammonia.

2. The improvement as in claim 1 further characterized in that said agent has a Ross-Miles initial foam height of at least about 10 cm. and a cumulative foam height of at least 30 cm.

3. The improvement as in claim 1 further characterized in that the agent is of the formula

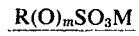

wherein $R$ is a radical selected from the group consisting of $R'$ and $R'(OCH_2CH_2)_n$, wherein $R'$ is a hydrocarbon radical having a carbon atom content in the range from about 8 to 26, and wherein $n$ is a number in the range 1—15, $m$ is 0 or 1, and $M$ is ammonium, an alkali metal cation, or mixtures thereof.

4. The improvement as in claim 3 further characterized in that $m$ of the formula is zero.

5. The improvement as in claim 4 further characterized in that the anion of said agent is of the formula $$R''C_6H_4SO_3^-$$

wherein $R''$ is a hydrocarbon radical, having a carbon atom content in the range 10—20 carbon atoms.

6. The improvement as in claim 4 wherein the anion of said agent is of the formula $RSO_3^-$, wherein $R$ is an alkyl radical having a carbon atom content in the range from abut 8—20 carbon atoms.

7. The improvement as in claim 4 further characterized in that the agent is an alpha-olefin sulfonate.

8. The improvement as in claim 3 further characterized in that $m$ is 1 and $n$ is in the range 3—5.

9. The improvement as in claim 3 further characterized in that the agent is an olefin sulfonate.

10. The improvement as in claim 1 further characterized in that for each part of said ammonia an amount of the agent in the range from about 0.1 to 1 parts is preset.

11. The composition consisting essentially of an organic foaming agent, unneutralized ammonia and a solvent system, wherein the amount of the ammonia is at least 50 percent of the saturation value for said system and wherein the agent is one or more compounds of the formula $$R(O)_mSO_3M$$

wherein $R$ is a radical selected from the group consisting of $R'$ and $R'(OCH_2CH_2)_n$ in which $R'$ is a hydrocarbon radical having a carbon atom content in the range from about 8 to 26 and wherein $n$ is a number in the range from about 1 to 15, $m$ is 0 or 1, and $M$ is ammonium, or an alkali metal cation; said composition containing for each part by weight of the ammonia an amount of the agent in the range from about 0.1 to 5 parts; and said solvent system is water and at least one cosolvent of the group $C_1$—$C_3$ alkanols and acetone, wherein not more than 50 weight percent of said system is cosolvent.

12. The composition as in claim 11 further characterized in that the amount of unneutralized ammonia is in the range from about 75 to 100 percent of the saturation value.

13. The composition as in claim 11 further characterized in that the amount of unneutralized ammonia is at least 90 percent of the saturation value.

14. The composition as in claim 11 further characterized in that about 50 weight percent of said solvent system is water.

15. The composition as in claim 11 further characterized in that the amount of the agent is in the range from about 0.2 to 1 part per part of the ammonia.

16. The composition consisting essentially of an organic foaming agent, unneutralized ammonia and a solvent system, wherein the amount of the ammonia is at least 50 percent of the saturation value for said system and wherein the agent is one or more compounds of the formula $$ROSO_3$$

wherein $R$ is an oleophilic hydrocarbon radical having a carbon atom content in the range from about 10 to 20 carbon atoms and $M$ is ammonium, or an alkali metal cation, wherein for each part by weight of the ammonia there is present an amount of the agent in the range from about 0.1 to 1 part; wherein said solvent system is water and at least one cosolvent of the group $C_1$—$C_3$ alkanols and acetone, and wherein not more than 50 weight percent of said system is cosolvent.

17. The composition as in claim 16 further characterized in that the radical $R$ is an aliphatic hydrocarbon radical.

18. The composition as in claim 16 further characterized in that about 50 weight percent of said solvent system is water.

19. The composition consisting essentially of an organic foaming agent, unneutralized ammonia, and a solvent system, wherein the amount of the ammonia is at least 50 percent of the saturation value for said system and wherein the agent is one or more compounds of the formula $$RC_6H_4SO_3M$$

wherein $R$ is an alkyl radical having a carbon atom content in the range from about 10 to 15, and $M$ is ammonium or an alkali metal cation; said composition containing for each part by weight of the ammonia an amount of the agent in the range from about 0.1 to 1 part; wherein said solvent system is water and at least one cosolvent of the group C1—$C_3$ alkanols and acetone, and wherein not more than 50 weight percent of said system is cosolvent.

20. The composition as in claim 19 further characterized in that about 50 weight percent of said solvent system is water.

21. The composition consisting essentially of an olefin sulfonate salt foaming agent, unneutralized ammonia and a solvent system, wherein the amount of the ammonia is at least 50 percent of the saturation value for said system, wherein said agent is one or more of said salts having a carbon atom content in the range from about 10 to 20; wherein the cation of the salt is ammonium or an alkali metal; said composition containing for each part by weight of the ammonia an amount of the agent in the range from about 0.1 to 5 parts; wherein said solvent system is water and at least one cosolvent of the group $C_1$—C alkanols and acetone, and wherein not more than 50 weight percent of said system is cosolvent.

22. The composition as in claim 21 further characterized in that about 50 weight percent of said solvent system is water.

23. The composition consisting essentially of an organic foaming agent, unneutralized ammonia and a solvent system, wherein the amount of ammonia is at least 50 percent of the saturation value for said system and wherein the agent is one or more compounds of the formula $$RO(CH_2CH_2O)nSO_3M$$

wherein $R$ is a hydrocarbon radical having a carbon atom content in the range from about 8 to 18, $n$ is a number in the range 3 to 10, and $M$ is ammonium or an alkali metal; said composition containing for each part by weight of the ammonia an amount of the agent in the range from about 0.1 to 1 part; wherein said solvent system is water and at least one cosolvent of the group C1—$C_3$ alkanols and acetone, and wherein not more than 50 weight percent of said system is cosolvent.

24. The composition as in claim 23 further characterized in that not more than 50 weight percent of said solvent system is water.